(12) United States Patent
Li

(10) Patent No.: US 11,169,020 B2
(45) Date of Patent: Nov. 9, 2021

(54) TEST LIGHT ASSEMBLY AND LIGHT BARREL

(71) Applicant: TRIPLE WIN TECHNOLOGY(SHENZHEN) CO., LTD., Shenzhen (CN)

(72) Inventor: Gang-Jia Li, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 212 days.

(21) Appl. No.: 16/653,193

(22) Filed: Oct. 15, 2019

(65) Prior Publication Data

US 2021/0055154 A1 Feb. 25, 2021

(30) Foreign Application Priority Data

Aug. 20, 2019 (CN) .......................... 201910766718.4

(51) Int. Cl.
*G01J 1/04* (2006.01)

(52) U.S. Cl.
CPC .................................. *G01J 1/0437* (2013.01)

(58) Field of Classification Search
CPC ............................ G01J 1/0437; G01J 1/0462
See application file for complete search history.

(56) References Cited

U.S. PATENT DOCUMENTS

| 4,450,578 A | 5/1984 | Hill | |
|---|---|---|---|
| 2004/0141737 A1* | 7/2004 | Nomura | G02B 7/08 396/349 |
| 2009/0001296 A1 | 1/2009 | Kuduvalli | |

\* cited by examiner

*Primary Examiner* — Kevin K Pyo
(74) *Attorney, Agent, or Firm* — ScienBiziP, P.C.

(57) ABSTRACT

A light barrel configured to filter out stray light of a test light includes a casing and a number of light shield plates arranged within the casing. The light shield plates are parallel to each other and arranged within the casing along a direction in which the light source emits the test light. Each of the light shield plates defines a through hole for light from the test light to pass through. The through holes of the light shield plates are a same size and aligned. The light shield plates sequentially filter out stray light that does not pass through the through holes.

12 Claims, 1 Drawing Sheet

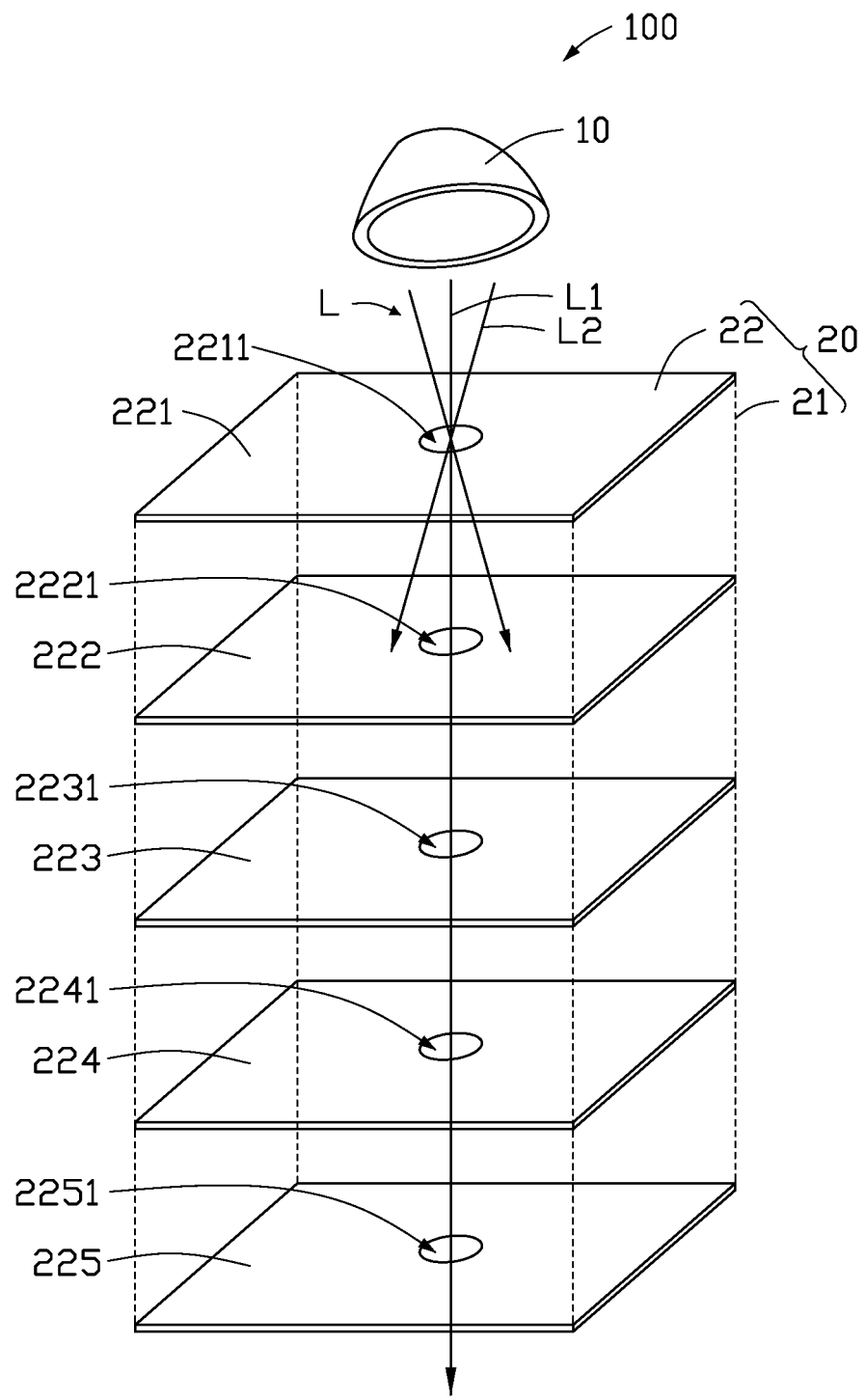

TEST LIGHT ASSEMBLY AND LIGHT BARREL

FIELD

The subject matter herein generally relates to test light assemblies, and pore particularly to a test light assembly having a light barrel for testing an imaging device.

BACKGROUND

Generally, an imaging device of a mobile phone, tablet computer, or the like is tested by a point light source. However, the point light source produces glare and other stray light, which reduces accuracy of testing.

BRIEF DESCRIPTION OF THE DRAWINGS

Implementations of the present disclosure will now be described, by way of embodiments, with reference to the attached FIGURES.

The FIGURE is a diagrammatic view of an embodiment of a test light assembly.

DETAILED DESCRIPTION

It will be appreciated that for simplicity and clarity of illustration, where appropriate, reference numerals have been repeated among the different FIGURES to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a test light assembly 100. The test light assembly 100 can be used for performing a flare image test on an imaging device of a mobile phone, a tablet, a car, and the like. The test light assembly 100 includes a light source 10 and a light barrel 20. The light source 10 is configured to provide a test light L. The light barrel 20 is configured to filter the test light L emitted from the light source 10, so that only a light ray L1 in a single direction is used for image testing.

The light source 10 may be an infrared light, a light emitting diode (LED), a halogen light, or a laser light, but is not limited thereto, and may be other light sources. In one embodiment, the light source 10 is a point light source.

The light barrel 20 includes a casing 21 and a plurality of light shield plates 22. The plurality of light shield plates 22 are substantially parallel to each other and arranged within the casing 21 along a direction in which the light source 10 emits the test light L.

In one embodiment, the casing 21 is made of a non-reflective material.

A shape of the casing 21 may be a cylinder, a cuboid, or the like. A shape of the light shield plates 22 is the same as the shape of the casing 21. Each of the light shield plates 22 defines a through hole for transmitting light, and a size of an outer perimeter of the light shield plate 22 is substantially equal to a size of an inner perimeter of the casing 21, such that the test light L emitted from the light source 10 can only pass through the through hole.

In one embodiment, the light shield plates 22 are made of an opaque material.

In one embodiment, the light shield plates 22 include a first light shield plate 221, a second light shield plate 222, a third light shield plate 223, a fourth light shield plate 224, and a fifth light shield plate 225. The first light shield plate 221, the second light shield plate 222, the third light shield plate 223, the fourth light shield plate 224, and the fifth light shield plate 225 are arranged in sequence in parallel in the casing 21 along a direction away from the light source 10. A first through hole 2211, a second through hole 2221, a third through hole 2231, a fourth through hole 2241, and a fifth through hole 2251 are respectively defined in a center of the first light shield plate 221, the second light shield plate 222, the third light shield plate 223, the fourth light shield plate 224, and the fifth light shield plate 225. The first through hole 2211, the second through hole 2221, the third through hole 2231, the fourth through hole 2241, and the fifth through hole 2251 are substantially aligned and are circular holes. The first through hole 2211, the second through hole 2221, the third through hole 2231, the fourth through hole 2241, and the fifth through hole 2251 have a same aperture size and have no burrs on an inner wall of the holes, so that the light ray L1 of the test light L can sequentially pass through the first through hole 2211, the second through hole 2221, the third through hole 2231, the fourth through hole 2241, and the fifth through hole 2251. Stray light L2 that is not parallel to the light ray L1 is blocked by the first light shield plate 221, the second light shield plate 222, the third light shield plate 223, the fourth light shield plate 224, and the fifth light shield plate 225.

A quantity of the light shield plates 22 can be set as needed. It should be understood that when the quantity of the light shield plates 22 increases, the stray light L2 is more effectively filtered out.

A spacing of the first light shield plate 221, the second light shield plate 222, the third light shield plate 223, the fourth light shield plate 224, and the fifth light shield plate 225 can be adjusted as needed. In one embodiment, the spacing of the first light shield plate 221, the second light shield plate 222, the third light shield plate 223, the fourth light shield plate 224, and the fifth light shield plate 225 is equal.

In the related art, a point light source is used for testing. The emitted test light generates stray light that is not parallel to the main light path, which affects accuracy of the Flare image test.

When the test light assembly 100 is used for testing, the stray light L2 of the test light L is sequentially filtered out by the plurality of light shield plates 22, so that only light rays parallel to the light ray L1 passes through the through holes, thereby improving a quality of the test light L and more accurately detecting a performance of the imaging device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A light barrel configured to filter out stray light of a test light, the light barrel comprising:
    a casing;
    a plurality of light shield plates arranged within the casing; wherein:
    the plurality of light shield plates are substantially parallel to each other and arranged within the casing along a direction in which the light source emits the test light;
    each of the plurality of light shield plates defines a through hole for light from the test light to pass through;
    the through holes of the plurality of light shield plates are a same size and aligned; and
    the plurality of light shield plates sequentially filter out stray light that does not pass through the through holes.

2. The light barrel of claim 1, wherein:
    a spacing of the plurality of light shield plates is adjustable.

3. The light barrel of claim 1, wherein:
    a spacing of the plurality of light shield plates is equal.

4. The light barrel of claim 1, wherein:
    the casing is made of a non-reflective material.

5. The light barrel of claim 1, wherein:
    the plurality of light shield plates is made of an opaque material.

6. The light barrel of claim 1, wherein:
    the plurality of light shield plates comprises a first light shield plate, a second light shield plate, a third light shield plate, a fourth light shield plate, and a fifth light shield plate;
    a first through hole, a second through hole, a third through hole, a fourth through hole, and a fifth through hole are respectively defined in a center of the first light shield plate, the second light shield plate, the third light shield plate, the fourth light shield plate, and the fifth light shield plate;
    the first through hole, the second through hole, the third through hole, the fourth through hole, and the fifth through hole are aligned and are circular holes;
    the first through hole, the second through hole, the third through hole, the fourth through hole, and the fifth through hole have a same aperture size and have no burrs on an inner wall of the holes.

7. A test light assembly configured to test an imaging device, the test light assembly comprising:
    a light source configured to emit a test light; and
    a light barrel comprising a casing and a plurality of light shield plates arranged within the casing; wherein:
    the plurality of light shield plates are substantially parallel to each other and arranged within the casing along a direction in which the light source emits the test light;
    each of the plurality of light shield plates defines a through hole for light from the test light to pass through;
    the through holes of the plurality of light shield plates are a same size and aligned; and
    the plurality of light shield plates sequentially filter out stray light that does not pass through the through holes.

8. The test light assembly of claim 7, wherein:
    a spacing of the plurality of light shield plates is adjustable.

9. The light barrel of claim 7, wherein:
    a spacing of the plurality of light shield plates is equal.

10. The light barrel of claim 7, wherein:
    the casing is made of a non-reflective material.

11. The light barrel of claim 7, wherein:
    the plurality of light shield plates is made of an opaque material.

12. The light barrel of claim 7, wherein:
    the plurality of light shield plates comprises a first light shield plate, a second light shield plate, a third light shield plate, a fourth light shield plate, and a fifth light shield plate;
    a first through hole, a second through hole, a third through hole, a fourth through hole, and a fifth through hole are respectively defined in a center of the first light shield plate, the second light shield plate, the third light shield plate, the fourth light shield plate, and the fifth light shield plate;
    the first through hole, the second through hole, the third through hole, the fourth through hole, and the fifth through hole are aligned and are circular holes;
    the first through hole, the second through hole, the third through hole, the fourth through hole, and the fifth through hole have a same aperture size and have no burrs on an inner wall of the holes.

\* \* \* \* \*